US005746056A

United States Patent [19]
Smith

[11] Patent Number: 5,746,056
[45] Date of Patent: May 5, 1998

[54] OVERSPEED CONTROL FOR A HYDROSTATIC TRANSMISSION

[75] Inventor: David P. Smith, Joliet, Ill.

[73] Assignee: Caterpillar Inc., Peoria, Ill.

[21] Appl. No.: 720,398

[22] Filed: Sep. 30, 1996

[51] Int. Cl.⁶ .................................................. F16D 31/02
[52] U.S. Cl. .................................................. 60/447; 60/449
[58] Field of Search ...................................... 60/447, 449

[56] References Cited

U.S. PATENT DOCUMENTS

| | | | |
|---|---|---|---|
| 3,884,039 | 5/1975 | Pourian | 60/447 |
| 3,964,262 | 6/1976 | Patton | 60/447 |
| 3,987,622 | 10/1976 | Johnson | 60/420 |
| 4,365,473 | 12/1982 | Schexnayder et al. | 60/447 |
| 4,395,878 | 8/1983 | Morita et al. | 60/488 |
| 4,802,336 | 2/1989 | Mayr et al. | 60/452 |
| 5,447,029 | 9/1995 | Swick et al. | 60/492 |

Primary Examiner—F. Daniel Lopez
Attorney, Agent, or Firm—John W. Grant; J. W. Burrows

[57] ABSTRACT

An overspeed control for a hydrostatic transmission of a mobile machine includes a speed control valve arrangement connected to a fixed displacement pump through a supply line and to a pressure responsive displacement controller of a variable displacement hydraulic pump of the transmission. An overspeed control valve is connected to the supply line and is operative for reducing the fluid pressure level in the displacement controller when the speed control valve arrangement is in an operative position and the rotational speed of the engine exceeds a predetermined level. This reduces the displacement of the variable displacement pump (which acts as a motor in a downhill situation) and thus increasing engine retarding and transmission losses for preventing the positive grade from accelerating the machine, engine and/or the components of the hydrostatic transmission to speeds exceeding their designed limits.

6 Claims, 2 Drawing Sheets

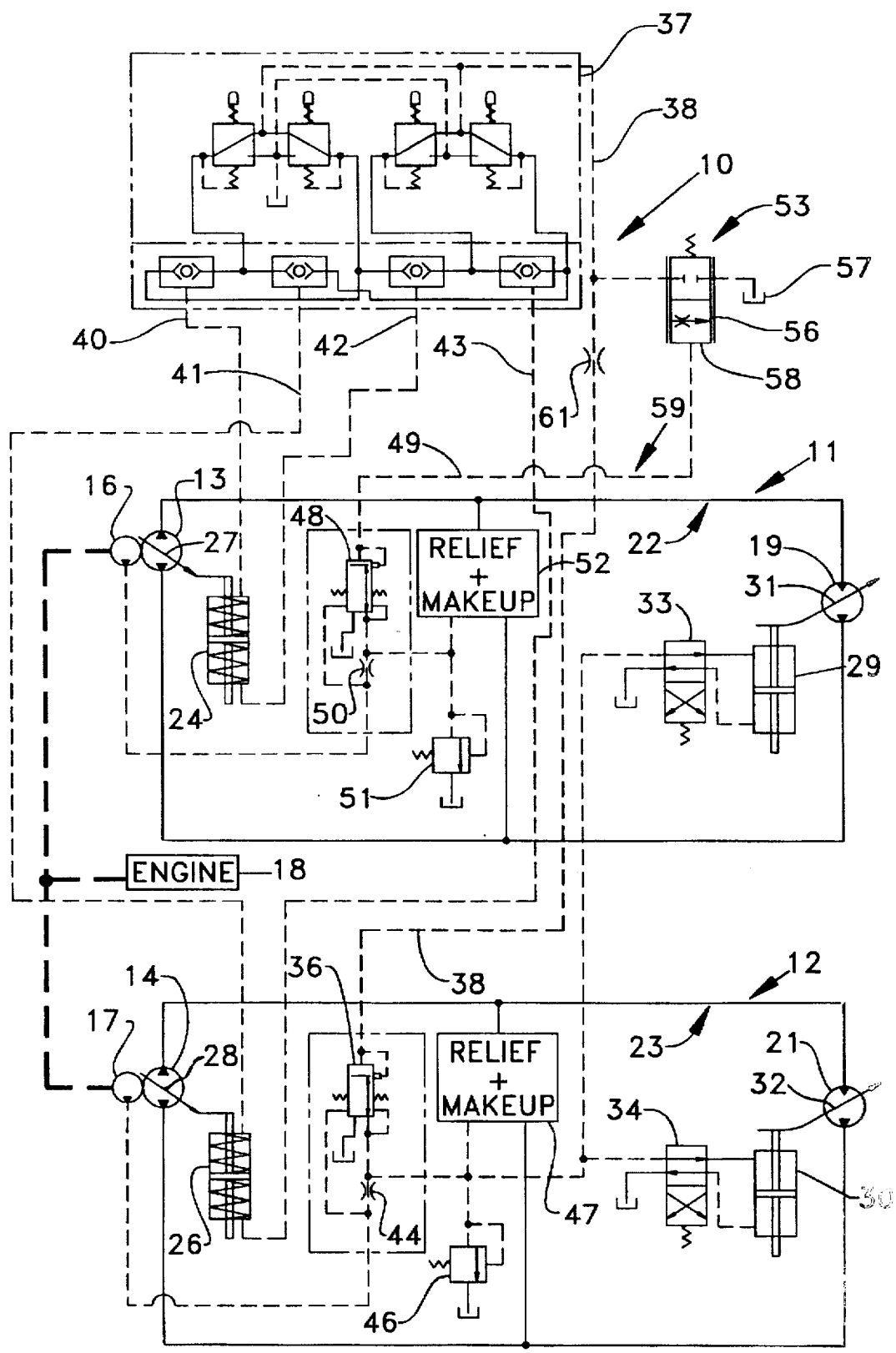
Fig_1_

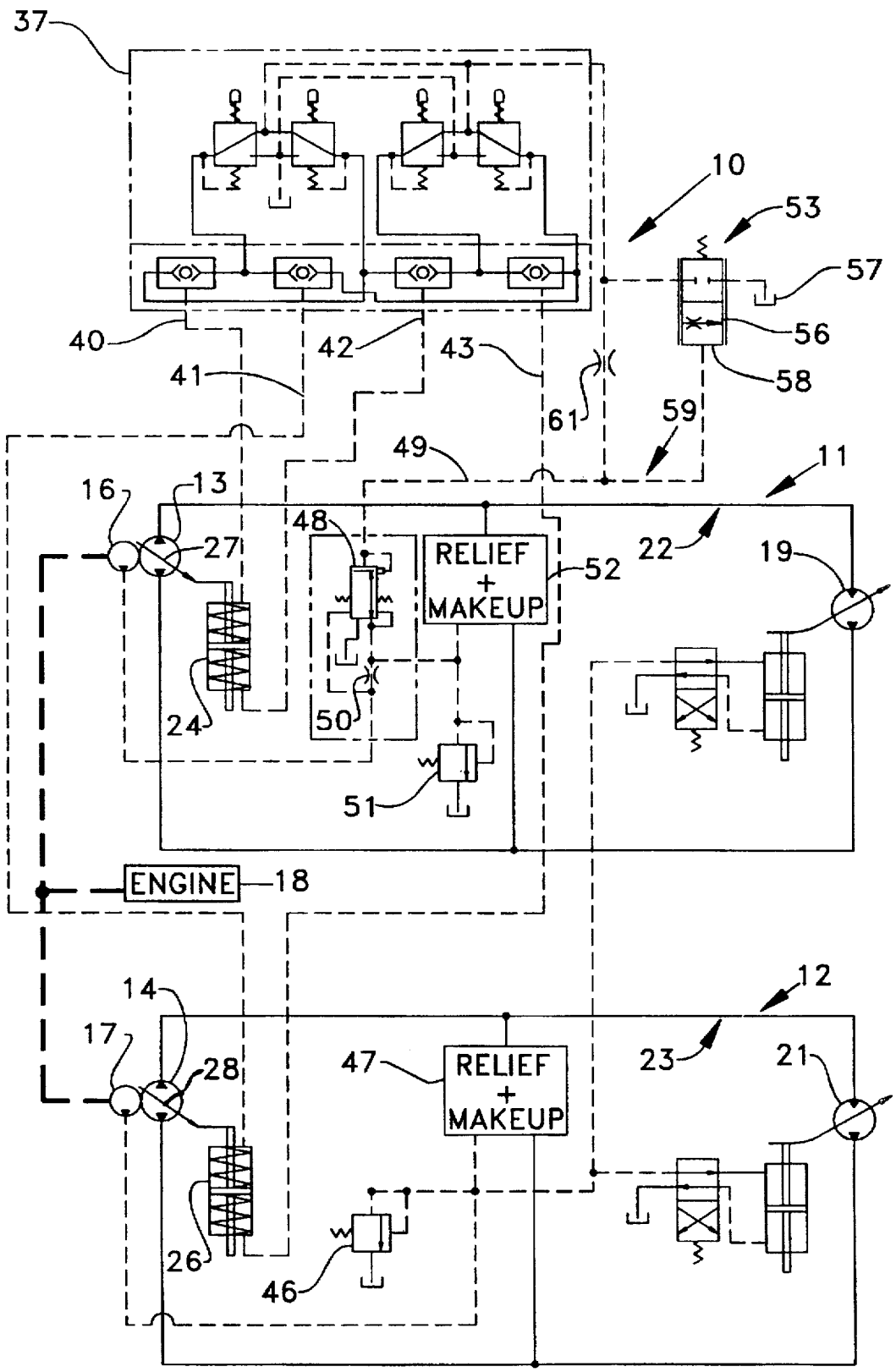
Fig_2

OVERSPEED CONTROL FOR A HYDROSTATIC TRANSMISSION

TECHNICAL FIELD

This invention relates generally to a hydrostatic transmission for a mobile machine and, more particularly, to an overspeed control for preventing the transmission from accelerating the engine, and thus the components of the hydrostatic transmission, to an overspeed condition when the machine is descending a steep hill.

BACKGROUND ART

Some industrial machines have a hydrostatic transmission for delivering power from the engine to the wheels or tracks. Such a hydrostatic transmission commonly has a variable displacement pump and a fixed displacement drive motor, or in some cases a variable displacement drive motor, interconnected through a closed loop fluid circuit. When the machine having such a transmission is descending a hill, the drive motor tends to act as a hydraulic pump and directs pressurized fluid to the pump which acts as a hydraulic motor. The engine, being directly connected to the pump, normally provides a braking or retarding action by resisting the driving action of the pump. However, when the machine is descending a steep hill, the driving power generated by the transmission may be sufficient to cause the machine to overspeed due to the engine retarding action being lower than the driving action of the pump. For example, with the pump in its maximum displacement condition, it is in a condition for providing maximum torque when it acts as a motor and being driven by fluid directed thereto from the drive motor which is acting as a pump and being driven by the wheels or tracks. Thus the torque generated by the pump under this condition can overpower the engine and drive it at a speed commensurate with fluid flow in the closed loop of the hydrostatic transmission. Such an overspeed condition of the machine could damage the motor since it is being rotated faster than its designed operating speed or damage could occur to the engine or the pump resulting from excessive engine speed.

U.S. Pat. No. 4,365,473 discloses an overspeed control concept for correcting the overspeed problem in a hydrostatic transmission. However, that control is designed specifically for a pump control in which the displacement is controlled by an underspeed actuator mechanically connected to the displacement controller and would not be suitable for use in a low cost configuration having the pump displacement controlled by a pressure responsive displacement controller.

The present invention is directed to overcoming one or more of the problems as set forth above.

DISCLOSURE OF THE INVENTION

In one aspect of the present invention, an overspeed control is provided for a hydrostatic transmission which includes a variable displacement hydraulic pump driven by an engine and having a pressure responsive displacement controller for increasing the output displacement of the variable displacement pump in response to an increase in pressure directed thereto and for decreasing the output displacement of the variable displacement pump in response to a decrease in pressure. The overspeed control comprises a speed control valve connected to the fixed displacement pump driven by the engine and the displacement controller and having at least one operative position establishing a fluid pressure level in the displacement controller. A device is provided for reducing the fluid pressure level in the displacement controller when the speed control valve is in its operative position and the rotational speed of the engine exceeds a predetermined level.

BRIEF DESCRIPTION OF THE DRAWINGS

FIG. 1 is a schematic illustration of an embodiment of the present invention; and FIG. 2 is a schematic illustration of another embodiment of the present invention.

BEST MODE FOR CARRYING OUT THE INVENTION

An overspeed control 10 is shown in combination with a pair of hydrostatic transmissions 11,12. Each of the transmissions has a reversible variable displacement hydraulic pump 13,14 and a fixed displacement pump 16,17 driven by an engine 18 and a two speed hydraulic drive motor 19,21 connected to the variable displacement hydraulic pump in a closed loop circuit 22,23. Each of the variable displacement hydraulic pumps 13,14 has a pressure responsive displacement controller 24,26 connected to a displacement control member 27,28 for increasing the output displacement of the variable displacement pump in response to an increase in pressure directed thereto and for decreasing the output displacement of the variable displacement pump in response to a decrease in pressure in the usual manner. Each displacement controller 24,26 is spring biased to a zero displacement setting to provide a neutral condition for the transmission.

Each of the drive motors 19,21 has a pressure responsive displacement controller 29,30 connected to a displacement control member 31,32. A two position solenoid valve 33,34 is connected to opposite ends of the displacement controllers 29,30. Pressurized fluid to control the displacement control members 31,32 may be provided in a conventional manner by a charge pump as illustrated or by receiving pressurized fluid from either of the closed loop circuits 22,23. The hydraulic motors 19,21 are suitably drivingly connected to a pair of wheels or tracks, not shown. Alternatively, the drive motors can be fixed or variable displacement motors.

The fixed displacement pump 17 is connected to a combined direction, steering, and speed control valve arrangement 37 through a supply line 38. A pressure regulating valve 36 is disposed in the supply line for normally maintaining a control pressure in the supply line at or above a predetermined level.

The control pressure is proportional to engine speed and is adjustable to a predetermined characteristic curve. The valve arrangement 37 is connected to the displacement controllers 24,26 through four control lines 40,41,42,43.

In this embodiment, the pressure regulating valve 36 is a signal multiplying valve disposed to increase the pressure level of the fluid in the supply line 38 commensurate with an increase in the engine speed. The signal multiplying valve 36 includes an orifice 44 and is responsive to a differential pressure across the orifice 44 so that the control pressure in the supply line 38 is essentially proportional to the engine speed. Excess fluid from the fixed displacement pump 17 is directed to a charge pressure relief valve 46 and a relief and makeup valve 47 connected to the closed loop circuit 23 in the usual manner.

The fixed displacement pump 16 is connected to another signal multiplying valve 48 which provides a source of control pressure through a supply line 49. The signal multiplying valve 48 includes an orifice 50 and is responsive to a differential pressure across the orifice 50 so that the control pressure in the supply line 49 is essentially proportional to the engine speed. Excess fluid from the fixed displacement pump 16 is directed to another charge pressure relief valve 51 and another relief and makeup valve 52 connected to the closed loop circuit 22.

The override control 10 includes a means 53 for reducing the pressure in the appropriate control lines 40,41,42,43 when the engine 18 exceeds a predetermined rotational speed. The pressure reducing means 53 includes an overspeed control valve 56 connected to the supply line 38 and a tank 57. The overspeed valve 56 has an end 58 connected to the supply line 49 and is spring biased to a closed flow blocking position. The signal multiplying valve 48 functions as a means 59 for moving the overspeed control valve 56 towards an open position to decrease the pressure in the supply line when the speed of the engine exceeds said predetermined level. It is recognized that the overspeed control valve 56 could be replaced with an electrically actuated proportional valve that is responsive to an engine overspeed condition. Likewise, it is recognized that the overspeed control valve 56 and the signal multiplying valve 48 could be replaced with an electrically actuated proportional valve that is responsive to sensing of either or both an engine overspeed condition or a machine overspeed condition as compared to the desired engine speed or machine ground speed. A control orifice 61 is disposed in the supply line 38 upstream of the point of connection of the overspeed control valve 56 with the supply line 38.

In this embodiment, the gain of the control pressure in the supply line 49 is somewhat lower than the gain of the control pressure in the supply line 38.

Another embodiment of the overspeed control 10 of the present invention is disclosed in FIG. 2. It is noted that the same reference numerals of the first embodiment are used to designate similarly constructed counterpart elements of this embodiment. In this embodiment, however, the pressure multiplying valve 36 has been omitted and the pressure multiplying valve 48 is connected to the valve arrangement 37 and the end 58 of the overspeed valve 56 through the supply line 49. The control orifice 61 is disposed in the supply line 49 upstream of the connection between the supply line 49 and the overspeed control valve 56, and downstream of the connection between the supply line 49 and the end 58 of the overspeed control valve.

This embodiment would also be useful on a machine having a single hydrostatic transmission for transmitting power from the engine to one or more drive wheels or tracks.

INDUSTRIAL APPLICABILITY

In use, a forward drive condition of the machine with the FIG. 1 embodiment is obtained by manipulation of one of the elements of the valve arrangement 37 to direct pressurized fluid through the control lines 40 and 41 to one end of the actuators 24,26 to simultaneously move the displacement members 27,28 of the variable displacement pumps 13,14 for pumping fluid from the variable displacement pumps 13,14 to the hydraulic motors 19,21 in a first direction. Conversely, a reverse drive condition is obtained by manipulation of the appropriate element of the valve arrangement 37 to direct pressurized fluid through the control lines 42,43 to the other ends of the actuators 24,26 for moving the displacement members 27,28 in the opposite direction so that fluid pumped from the pumps 13,14 is directed to the hydraulic motors 19,21 in the opposite direction. In both conditions, the displacement of the displacement members 27,28 is controlled by the pressure level directed to the actuators 24,26. During normal operation of the machine, the engine 18 is operated at a preselected high-idle speed so that the pressure levels in the supply lines 38 and 49 remain at a substantially constant level commensurate with the engine speed.

However, should the engine speed exceed its high-idle speed such as might occur when the machine is descending a positive grade with the pumps 13,14 at their maximum displacement position, the pressure level in the supply line 49 increases proportional to the increase in engine speed. When the engine speed exceeds a predetermined level, the pressure in the supply line 49 becomes sufficient to move the overspeed control valve 56 towards its open position to communicate the supply line 38 with the tank. This generates a pressure drop across the control orifice 61 and thereby reduces the level of the control pressure in the supply line 38 and hence the pressure level in the appropriate control lines 40,41 or 42,43 dependent upon the travel direction of the machine. Reducing the pressure level in the appropriate control lines causes the actuators 24,26 to move the displacement control members 27,28 toward a reduced displacement setting. Reducing the displacement of the variable displacement pumps (which are acting as a motor in a downhill situation) increases their speed which increases the engine retarding torque. This allows the machine speed to be limited such that the motor, pump and engine designed operating speeds are not exceeded.

After the machine reaches the bottom of the hill, or other procedures taken to slow the engine speed to its high-idle speed, the pressure level in the supply line 49 decreases causing the overspeed control valve 56 to return to its closed flow-blocking position so that the pressure in supply line 38 supplying the control valve arrangement 37 is no longer reduced by the overspeed control 10.

The basic operation of the hydrostatic transmission of the embodiment of FIG. 2 is essentially the same as the operation of the first embodiment. The only difference is that the same signal modifying valve 48 supplies pressurized fluid to the control valve arrangement 37 and also provides the signal to the overspeed control valve 53. The orifice 61 is used such that upstream pressure acts to shift the overspeed control valve 56 towards its open position and pressure downstream of the orifice 61 is reduced and is directed to the control valve arrangement 37.

The present invention has particular utility on a machine having a hydrostatic transmission as a control for preventing a positive grade hill from accelerating the machine and the components thereof to speeds above their designed limits. The overspeed control operates automatically without operator input and functions by reducing the displacement of the variable displacement pumps, thereby increasing their speed when the pump is acting as a motor in a downhill condition. The engine retarding is increased which increases the retarding pressure which increases the hydrostatic transmission losses. The machine acceleration is then stopped and a maximum machine speed is reached that is below the designed speed limits of the motors, pumps and engine.

Other aspects, objects and advantages of this invention can be obtained from a study of the drawings, the disclosure and the appended claims.

I claim:

1. An overspeed control for a hydrostatic transmission which includes a variable displacement hydraulic pump driven by an engine and having a pressure responsive displacement controller for increasing the output displacement of the variable displacement pump in response to an increase in pressure directed thereto and for decreasing the output displacement of the variable displacement pump in response to a decrease in pressure, and a fixed displacement pump driven by the engine, comprising:

a speed control valve arrangement connected to the fixed displacement pump and the displacement controller and having at least one operative position establishing a fluid pressure level in the displacement controller; and means for reducing the fluid pressure level in the displacement controller when the speed control valve arrangement is in its operative position and the rotational speed of the engine exceeds a predetermined level so that the displacement of the variable displacement pump is reduced to increase the engine retarding torque when the variable displacement pump is acting as a motor, the pressure reducing means includes a supply line connecting the fixed displacement pump with the speed control valve arrangement, an overspeed control valve connected to the supply line and being spring biased to a closed position, and a means for moving the overspeed control valve towards an open position.

2. The overspeed control of claim 1 wherein the hydrostatic transmission includes another variable displacement hydraulic pump and another fixed displacement pump driven by the engine and including a pressure regulating valve disposed in the supply line for normally maintaining a control pressure in the supply line at or above a predetermined level.

3. The overspeed control of claim 2 wherein the moving means includes a signal multiplying valve disposed to increase the pressure level of the fluid at the end of the overspeed control valve commensurate with an increase in engine speed.

4. The overspeed control of claim 1 wherein the pressure reducing means includes an orifice disposed in the supply line upstream of the connection between the supply line and the overspeed control valve.

5. The overspeed control of claim 4 wherein the moving means includes a signal multiplying valve connected to an end of the overspeed control valve and disposed to increase the pressure level of the fluid in the supply line commensurate with an increase in the engine speed.

6. The overspeed control of claim 5 wherein the signal multiplying valve is disposed in the supply line between the fixed displacement pump and the orifice, and the end of the overspeed control valve is connected to the supply line upstream of the orifice.

* * * * *